(12) United States Patent
Clark et al.

(10) Patent No.: US 6,718,125 B2
(45) Date of Patent: Apr. 6, 2004

(54) BLDC MOTOR NOISE REDUCTION USING CONSTANT BUS CURRENT CONTROL COMMUTATION

(75) Inventors: Bret S. Clark, St. Louis, MO (US); J. Stephen Thorn, Florissant, MO (US)

(73) Assignee: Emerson Motor Co., St. Louis, MO (US)

( * ) Notice: Subject to any disclaimer, the term of this patent is extended or adjusted under 35 U.S.C. 154(b) by 0 days.

(21) Appl. No.: 09/768,617

(22) Filed: Jan. 25, 2001

(65) Prior Publication Data

US 2002/0037163 A1 Mar. 28, 2002

Related U.S. Application Data

(63) Continuation-in-part of application No. 09/669,826, filed on Sep. 26, 2000.

(51) Int. Cl.$^7$ .................................................. H02P 5/06
(52) U.S. Cl. .................. 388/801; 318/138; 318/245; 318/254; 318/439; 318/599; 318/432; 318/434; 388/804
(58) Field of Search ................................. 318/138, 245, 318/254, 439, 599, 432, 434, 811; 388/801, 804

(56) References Cited

U.S. PATENT DOCUMENTS

| | | | | |
|---|---|---|---|---|
| 4,544,868 A | * | 10/1985 | Murty | 318/254 |
| 5,111,095 A | | 5/1992 | Hendershot | |
| 5,191,269 A | | 3/1993 | Carobolante | |
| 5,341,077 A | | 8/1994 | Chen et al. | |
| 5,463,299 A | | 10/1995 | Futami et al. | |
| 5,491,393 A | * | 2/1996 | Uesugi | 318/439 |
| 5,625,264 A | | 4/1997 | Yoon | |
| 5,723,967 A | * | 3/1998 | Hongo et al. | 318/254 |
| 5,780,986 A | | 7/1998 | Shelton et al. | |
| 5,793,169 A | | 8/1998 | De Filippis et al. | |
| 5,804,939 A | * | 9/1998 | Yamai et al. | 318/439 |
| 5,825,112 A | * | 10/1998 | Lipo et al. | 310/181 |
| 5,847,521 A | | 12/1998 | Morikawa et al. | |
| 5,859,519 A | * | 1/1999 | Archer | 318/801 |
| 5,869,946 A | | 2/1999 | Carobolante | |
| 5,955,851 A | | 9/1999 | Solie et al. | |
| 6,236,179 B1 | * | 5/2001 | Lawler et al. | 318/439 |
| 6,249,095 B1 | | 6/2001 | Takura | |
| 6,351,091 B1 | * | 2/2002 | Heinkel et al. | 318/254 |

FOREIGN PATENT DOCUMENTS

| | | | |
|---|---|---|---|
| DE | 1071200 A2 * | 7/2000 | H02P/6/20 |
| EP | 0 483 894 A1 | 5/1991 | |

* cited by examiner

Primary Examiner—Robert Nappi
Assistant Examiner—Tyrone Smith
(74) Attorney, Agent, or Firm—Harness, Dickey & Pierce, P.L.C.

(57) ABSTRACT

A motor control system creates a rounding effect on square wave phase currents which results in reduced acoustic noise. The control system includes a voltage source for providing a DC bus current, and an inverter. The inverter has a switching circuit for regulating the DC bus current to a fixed level. The switching circuit also forces consecutive phases of the motor to share the bus current at commutation. Forcing consecutive phases of the motor to share a desired amount of the DC bus current creates a "rounding" effect on the phase currents, which results in reduced acoustic noise. The preferred inverter has a plurality of transistors, and a control module. The control module selectively engages the transistors such that each phase of the motor has a phase turn-on point that occurs before a phase turn-off point of a preceding phase. The control module also pulse width modulates the transistors such that the DC bus current is regulated to the fixed level. The result is a motor control system and method that is less expensive and produces less acoustic noise than conventional noise.

16 Claims, 6 Drawing Sheets

BLDC MOTOR NOISE REDUCTION USING CONSTANT BUS CURRENT CONTROL COMMUTATION

This is a continuation-in-part of U.S. patent application Ser. No. 09/669,826 filed Sep. 26, 2000.

TECHNICAL FIELD

The present invention relates generally to motor control systems. More particularly, the invention relates to a motor control system that reduces acoustic noise in brushless DC motors by forcing subsequent phases of the motor to share a fixed current at commutation.

BACKGROUND

The development of technology in the office automation industry has often been driven by the need for quieter equipment. Quieter equipment typically requires quieter components and underlying systems. For example, the standard office photocopier will have thousands of components, and a large majority of these components will be candidates for reducing acoustic noise emanating from the copier. Another driving force behind the advancement of technology in the office automation industry is cost. It is easy to understand that an ongoing demand for less expensive equipment operating at the same quality level determines the extent to which noise can be reduced.

Motors are used in all types of office equipment for a seemingly endless number of purposes. While AC motors generate relatively small amounts of acoustic noise and are sometimes used in office equipment, a number of factors limit their attractiveness. For example, the relatively high power consumption of AC motors typically requires larger, more expensive power supplies. Furthermore, the office automation industry often requires efficient operation and dynamic control. As will be discussed in greater below, efficient operation and dynamic control are generally more difficult to achieve with AC motors due to synchronization issues. Thus, while AC motors can often be driven at relatively low noise levels, additional requirements such as power consumption and synchronization may dictate the use of different types of motors.

Three phase brushless DC (BLDC) motors can be very quiet when driven with a control capable of supplying sine wave currents to the motor. The reduction in noise is largely due to the fact that as each phase is excited, there is a smooth transition between minimum phase current and maximum phase current (and vice versa for de-excitation). It is in fact the smooth changing of currents and resultant forces that keeps the motor from resonating and thereby generating noise. Simply put, the motor (a resonating mechanical structure) only receives mechanical excitation at the frequency of the sine wave and therefore generates less acoustic noise.

On the other hand, driving BLDC motors with sine wave currents typically results in the synchronization and power consumption problems discussed above for the case of AC motors. This is important because in the office automation industry, synchronization is often paramount. Synchronization essentially involves matching the phase currents (and resulting phase excitations) with the speed of the rotor. Thus, the complicated current transitions associated with sine wave currents can be quite difficult to predict and control when dealing with a high speed motor. To further complicate matters, dynamic speed changes (often occurring between commutation steps) make the task of synchronizing the sine wave currents to the rotor even more difficult.

Driving the BLDC motor with square wave currents, on the other hand, resolves many of the above synchronization issues. Square wave currents have sharp rising and falling edges and are much easier to predict and control. Furthermore, square wave drive systems typically use three hall effect sensors to pick up the signals necessary to commutate the motor. Thus, the hall effect sensors provide a reliable mechanism for detecting speed changes between commutation steps. Since the synchronization benefits associated with square wave control translate into cost and size improvements, conventional motor control systems supply square wave currents to the motor.

In such cases, however, the acoustic benefits provided by BLDC motors are reduced because the rising and falling edges of the square wave currents produce acoustic noise in the motor at the commutation frequency. As already mentioned, acoustic noise is heavily dependent upon the excitation frequencies associated with the drive current. The frequency content of square wave currents is in fact very frequency "rich". More importantly, the rising and falling edges of the square wave currents are the primary source of these additional frequencies. It is also important to note that in addition to an increased number of excitation frequencies, the amplitude of these frequencies also increases under traditional square wave control. It is therefore desirable to provide a motor control system that produces the acoustic noise reduction benefits associated with sine wave currents, and the reduced synchronization costs associated with square wave currents.

SUMMARY OF THE INVENTION

The above and other objectives are provided by a system and method in accordance with the present invention for controlling a motor. The control system includes a voltage source for providing a DC bus current, and an inverter. The inverter has a switching circuit for regulating the DC bus current to a fixed level. The switching circuit also forces consecutive phases of the motor to share the bus current at commutation. Forcing consecutive phases of the motor to share a desired amount of the DC bus current creates a "rounding" effect on the phase currents, which results in reduced acoustic noise.

Further in accordance with the present invention, an inverter for a motor control system is provided. The inverter has a plurality of transistors, and a control module. The control module selectively engages the transistors such that each phase of the motor has a phase turn on point that occurs before a phase turn off point of a preceding phase. The control module also pulse width modulates the transistors such that the DC bus current is regulated to the fixed level.

In another aspect of the invention, a method for controlling a motor includes the step of determining a fixed level for a DC bus current. The DC bus current is then regulated to the fixed level, and consecutive phases of the motor are forced to share the bus current at commutation.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
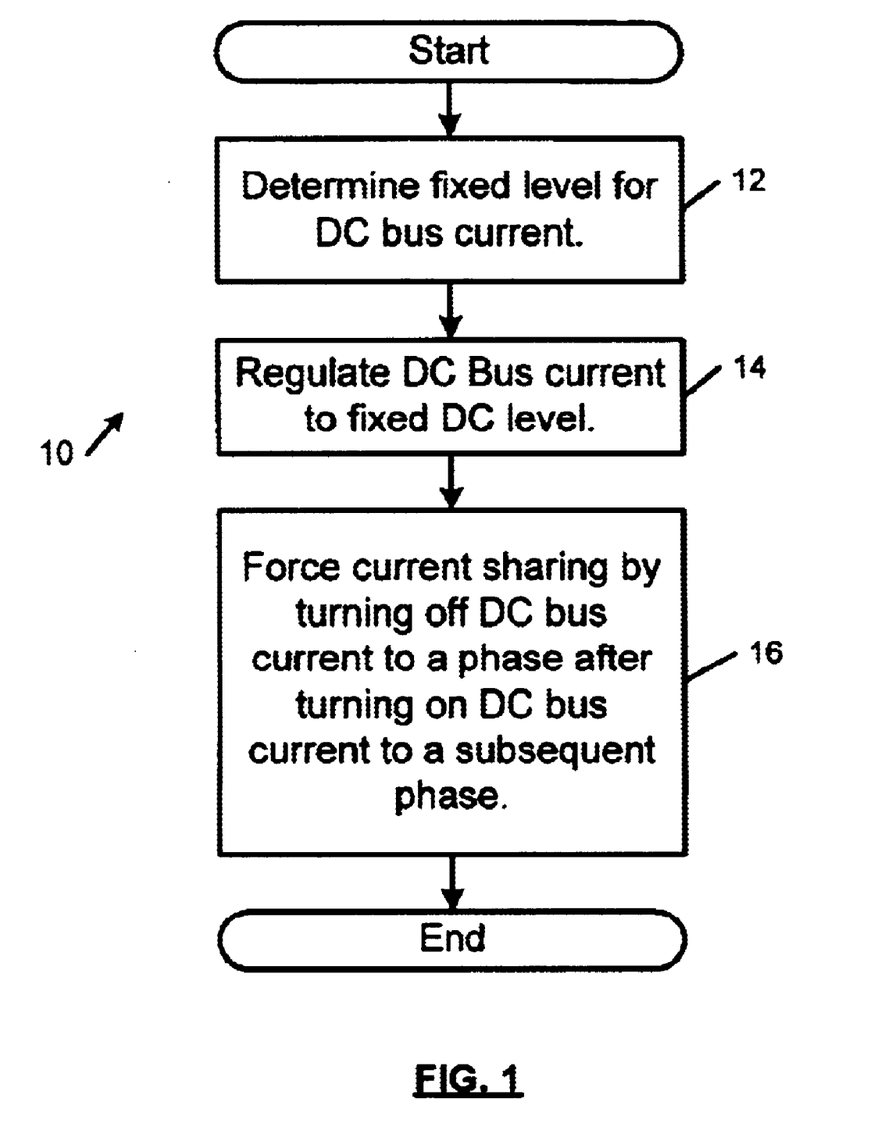
FIG. 1 is a flowchart of a method for controlling a motor in accordance with the present invention.

DC motor is shown generally at 10. It will be appreciated that while the present invention will be described with respect to a brushless DC (BLDC) motor, the benefits associated with the present invention can be achieved with other types of motors. It can be seen at step 12 that a fixed level for a DC bus current is determined. This fixed level will serve as a reference point for future steps. At step 14 the DC bus current is regulated to the fixed level. The method further provides for forcing consecutive phases of the motor to share the bus current at commutation at step 16. As will be discussed below, the preferred approach to forcing current sharing involves selectively enabling a plurality of transistors such that each phase of the motor has a phase turn on point that occurs before a phase turn off point of the preceding phase. The transistors are coupled to a voltage source (DC bus) and the motor. As will also be discussed below, regulation of the DC bus current is preferably achieved by pulse width modulating a plurality of transistors, where the transistors are coupled to a voltage source and the motor. It will be appreciated that, providing a fixed current and forcing current sharing of this current effectively allows a standard square wave to be rounded into a more sinusoidal shape. The result is a significant reduction in acoustic noise without the added expense of sine wave control.

Suppose, for example, that a BLDC motor has three phases A, B, and C. Suppose further that the DC bus current is regulated to a fixed level of 1 mA. When phase A is at full excitation, 1 mA will be flowing through the corresponding phase A winding. As the next commutation approaches, the phase turn-on point of phase B is moved ahead in time to occur before the phase turn-off point of phase A. Thus, the amount of current flowing through the phase B winding gradually increases from approximately zero to say, 0.1 mA. Thus, the phase A current must decrease to 0.9 mA. This distribution trend continues to 0.2/0.8, 0.3/0.7 and so on, until all of the DC bus current flows through the phase B winding. The square wave phase currents are therefore rounded to more closely resemble sine wave currents.

While the above method significantly reduces acoustic noise, it is important to note that there is also an efficiency tradeoff. Specifically, as the overlap between consecutive phases is increased, the maximum achievable torque is reduced. Simply put, there is an optimal amount of current sharing that will provide the desired level of efficiency and noise for a given application. The presently preferred amount of overlap is 24° electrical.

Figure 2:
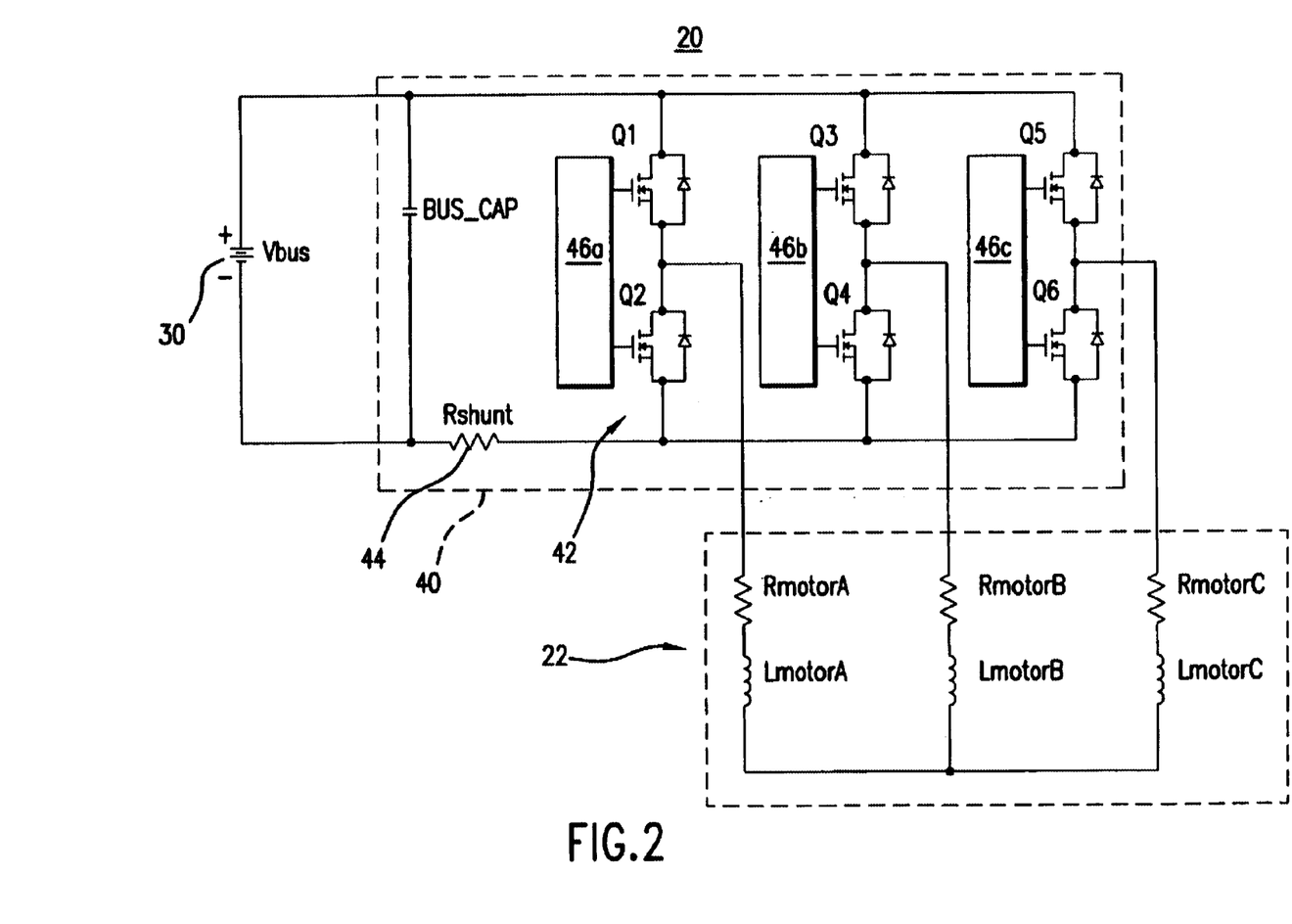
FIG. 2 is a circuit schematic of a motor control system in accordance with a preferred embodiment of the present invention.

Turning now to FIG. 2, one approach to the above method is shown. Specifically, it can be seen that a preferred motor control system 20 has a voltage source 30 and an inverter 40. The voltage source 30 ($V_{bus}$) provides a DC bus current, that is used by a motor 22 to operate an attached load (not shown). The inverter 40 has a phase switching circuit 42 for regulating the DC bus current to a fixed level. The switching circuit 42 forces consecutive phases of the motor to share the bus current at commutation. Specifically, the preferred switching circuit has a plurality of transistors Q1 through Q6 coupled to the motor 22 and the voltage source 30. A control module 46a, 46b, and 46c (collectively referred to as 46) is coupled to the transistors and can be implemented by any number of hardware/software techniques currently known in the art. For example, the control module 46 may be a microprocessor programmed to execute the required steps discussed herein.

In the preferred embodiment, the control module 46 forces current sharing by selectively enabling the transistors such that each phase of the motor 22 has a phase turn-on point that occurs before a phase turn-off point of a preceding phase. This may be achieved by either advancing the phase turn-on point in time or delaying the phase turn-off point in time or a combination thereof.

It will also be appreciated that the control module 46 also regulates the DC bus current to the fixed level by pulse width modulating the transistors. Thus, by switching the transistors at high frequency and adjusting the ratio of the time a transistor is switched on to the time a transistor is switched off, the current flowing in the DC bus can be regulated. This type of inverter is commonly called a voltage source inverter. In order to regulate the DC bus current in a closed loop fashion, the inverter further includes a current measurement device such as a shunt resistor 44 having the value $R_{shunt}$ for measuring the DC bus current. The control module 46 therefore pulse width modulates the transistors based on the measured DC bus current. Specifically, the resistor 44 is connected in series with a negative rail of the voltage source 30, and the control module 46 pulse width modulates the transistors based on a voltage drop across the resistor 44.

It is important to note that the above-described shunt resistor 44 is only one approach to measuring the DC bus current. In fact, the shunt resistor approach was chosen primarily for the purposes of simplicity and explanation. Other current measurement systems are well-known in the art and can readily be used in place of shunt resistor 44.

Figure 3:
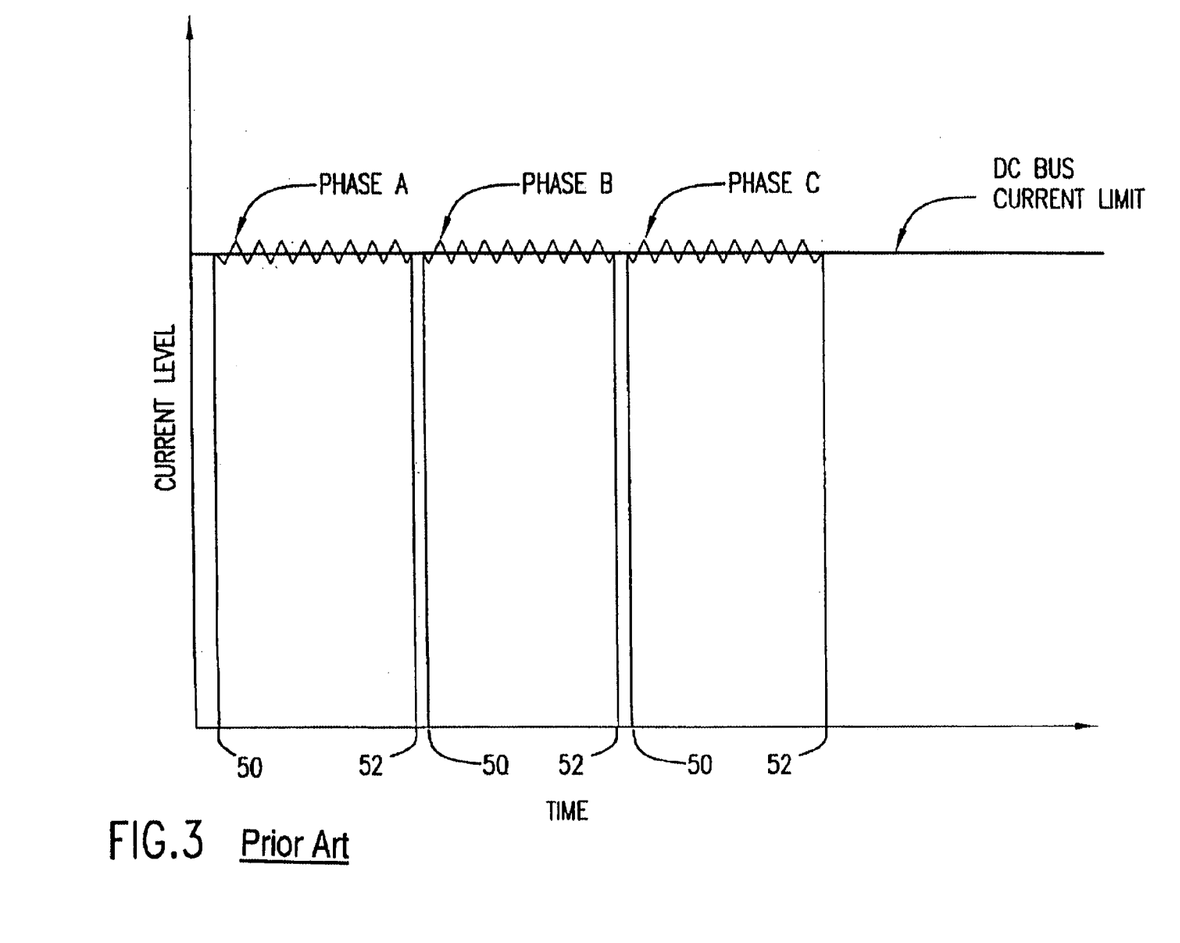
FIG. 3 is a plot showing conventional bus currents, useful in understanding the invention.
Figure 4:
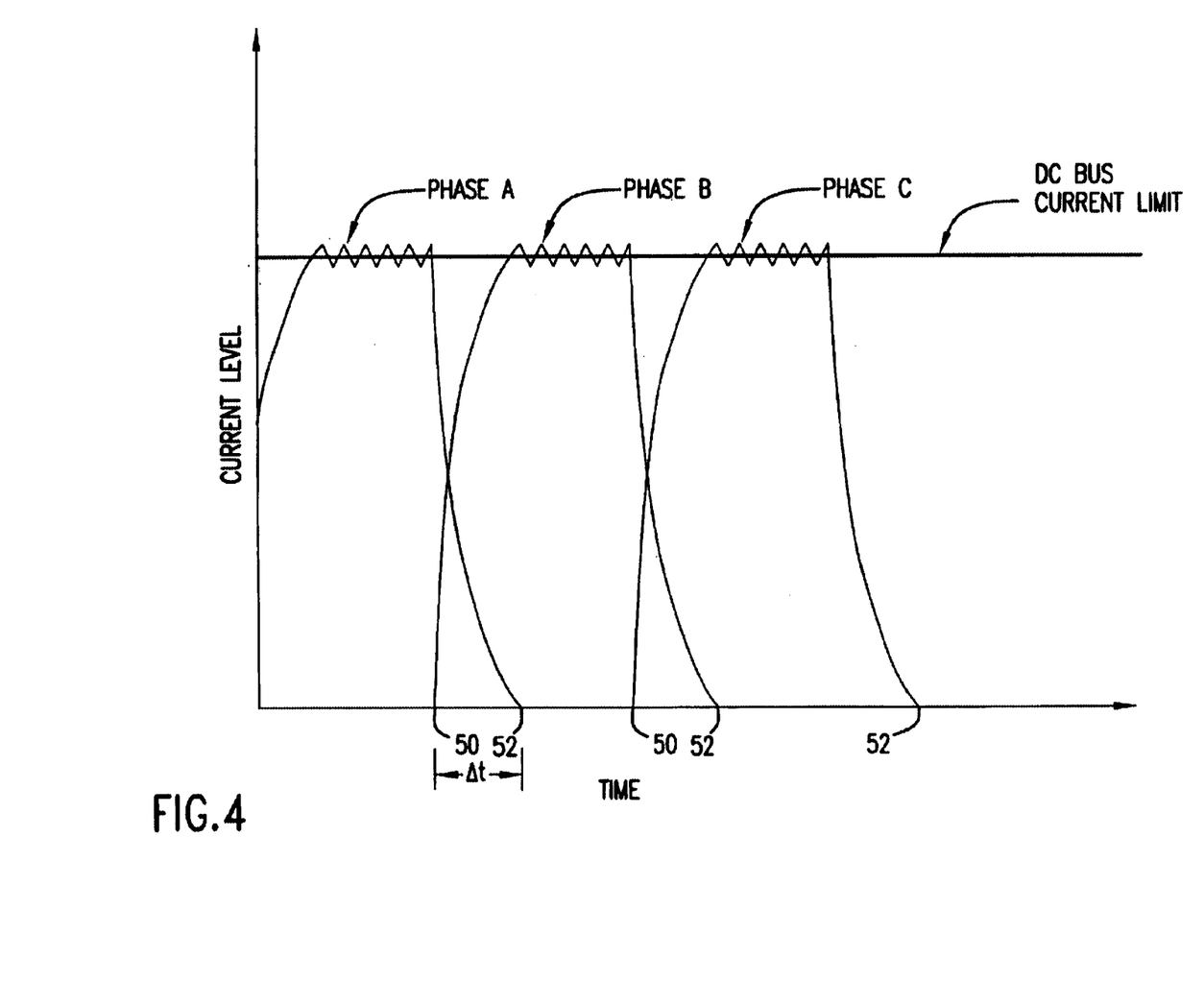
FIG. 4 is a plot showing bus currents in accordance with the present invention.

Turning now to FIGS. 3 and 4, operation of the preferred embodiment will be better understood. Specifically, FIG. 3 demonstrates a conventional approach to driving BLDC motors. It can be seen that the phase turn on point 50 for each phase occurs after the phase turn off point 52 for the previous phase. This results in very sharp rising and falling edges that produce acoustic noise at the commutation frequency. FIG. 4, on the other hand, shows the bus current distribution under the present invention. Here, it can be seen that the phase turn on points 50 have been advanced in time to occur before the phase turn off points 52. The result is an overlap time Δt in which subsequent phases share the fixed current provided by the DC bus. It can be seen that the resulting shapes of the bus current traces are rounded, which leads to reduced acoustic noise.

Figure 5:
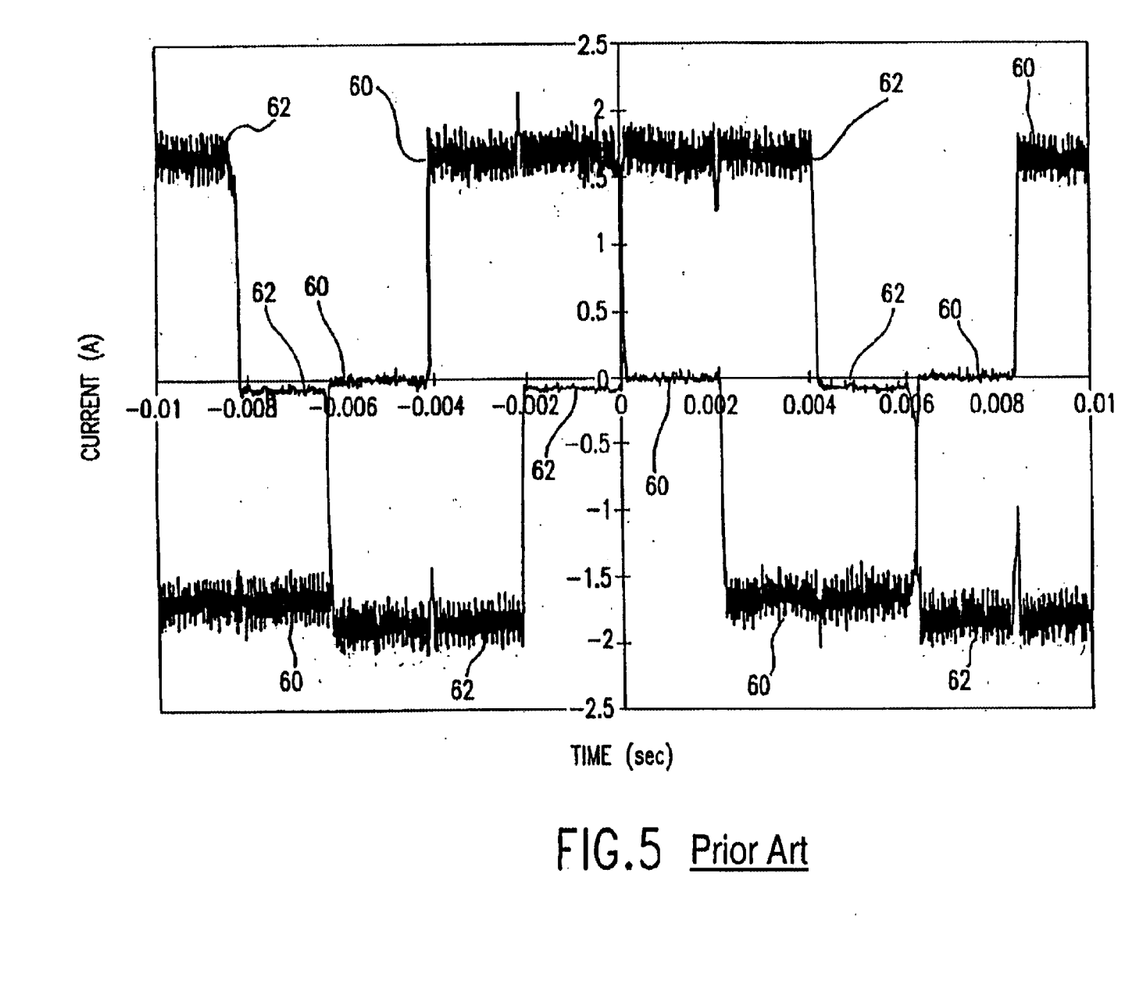
FIG. 5 is a plot showing conventional phase currents, useful in understanding the present invention.
Figure 6:
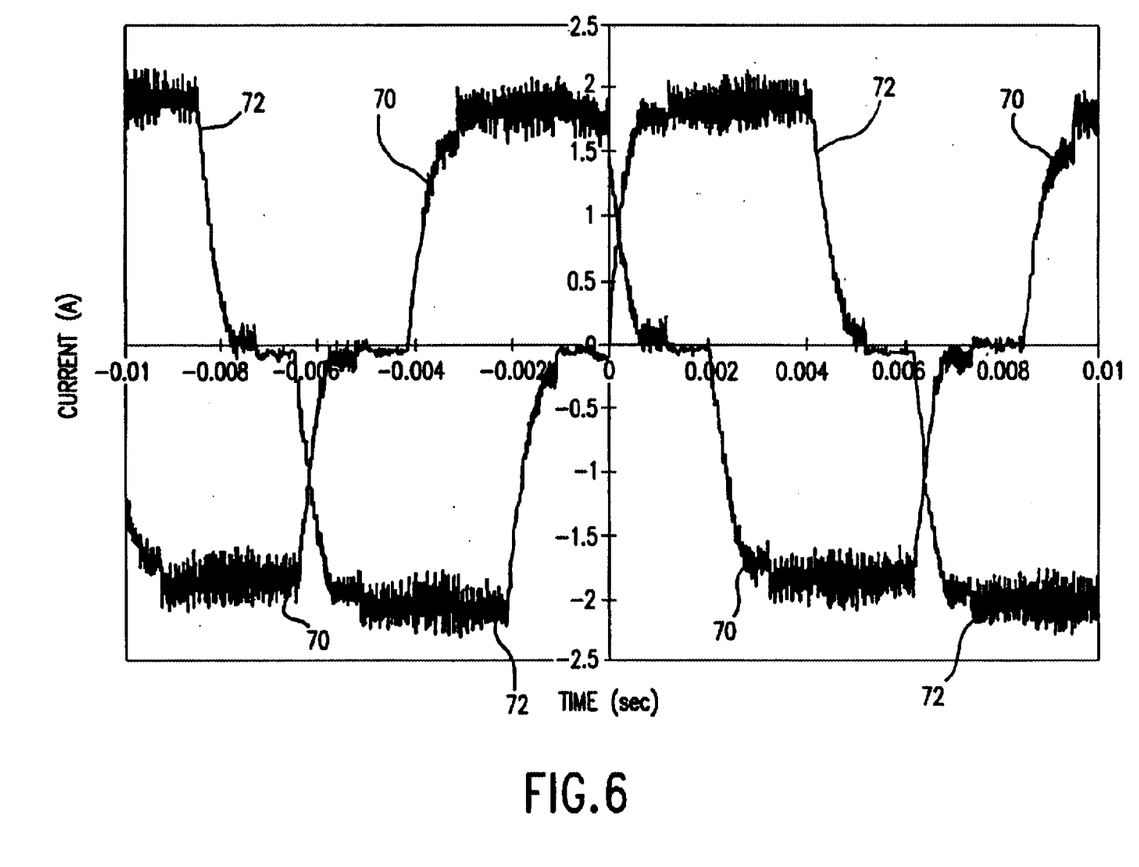
FIG. 6 is a plot of phase currents in accordance with the present invention.

To better demonstrate the motor phase currents, FIGS. 5 and 6 are provided. Once again, in FIG. 5 it can be seen that the phase A trace 60 and the phase B trace 62 have sharp rising and falling edges that indicate increased noise. FIG. 6, on the other hand, shows that the phase A trace 70 and the phase B trace 72 of the present invention have sloped edges due to the sharing of the bus current during commutation.

As already noted, the present invention provides a solution to reducing costs as well as reducing noise. Specifically, the present invention represents an improvement over conventional square wave approaches in that acoustic noise is reduced by forced sharing of a fixed amount of current. The present invention also represents an improvement over conventional approaches involving the application of sine wave currents in that costs are significantly reduced.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A control system for a motor including a plurality of phases, comprising:
   a voltage source for providing a DC bus current; and
   an inverter having a switching circuit for regulating the DC bus current to a fixed current level,
   wherein the switching circuit defines alternating overlapping periods and non-overlapping periods and delivers the fixed current level to one of the phases during the non-overlapping periods, and
   wherein the switching circuit supplies a decreasing current level to a first phase and an increasing current level to a second phase during an overlapping period such that said first and second phases share the fixed current level and a sum of current that is supplied to said first phase and said second phase is substantially equal to said fixed current level.

2. The control system of claim 1 wherein the switching circuit includes:
   a plurality of transistors coupled to the motor and the voltage source; and
   a control module coupled to the transistors.

3. The control system of claim 2 wherein the control module selectively enables the transistors such that each phase of the motor has a phase turn on point that occurs before a phase turn off point of a preceding phase.

4. The control system of claim 2 wherein the control module pulse width modulates the transistors such that the DC bus current is regulated to the fixed level.

5. The control system of claim 4 wherein the inverter further includes a current measurement device for measuring the DC bus current, the control module pulse width modulating the transistors based on the measured DC bus current.

6. The control system of claim 5 wherein the current measurement device includes a resistor connected in series with a negative rail of the voltage source, the control module pulse width modulating the transistors based on a voltage drop across the resistor.

7. The control system of claim 1 wherein the motor is a three-phase DC motor.

8. The control system of claim 7 wherein the DC motor is a brushless motor.

9. An inverter for a motor control system, the inverter comprising:
   a plurality of transistors;
   a control module for selectively enabling the transistors such that each phase of the motor has a phase turn on point that occurs before a phase turn off point of a preceding phase,
   wherein said control module pulse width modulates the transistors such that the DC bus current is regulated to a fixed current level,
   wherein the control module defines alternating overlapping periods and non-overlapping periods and delivers the fixed current level to one of the phases during the non-overlapping periods, and
   wherein the control module supplies a decreasing current level to a first phase and an increasing current level to a second phase during an overlapping period such that said first and second phases share the fixed current level and a sum of current that is supplied to said first phase and said second phase is substantially equal to said fixed current level.

10. The inverter of claim 9 further including a measurement resistor connected in series with a negative rail of a voltage source, the control module pulse width modulating the transistors based on a voltage drop across the measurement resistor.

11. The inverter of claim 9 wherein the motor is a three-phase DC brushless motor.

12. A method for controlling a motor including a plurality of phases, comprising:
   providing a DC bus current;
   regulating the DC bus current to a fixed current level;
   defining alternating overlapping periods and non-overlapping periods;
   delivering the fixed current level to one of the phases during the non-overlapping periods; and
   supplying a decreasing current level to a first phase and an increasing current level to a second phase during an overlapping period such that said first and second phases share the fixed current level and a sum of current that is supplied to said first phase and said second phase is substantially equal to said fixed current level.

13. The method of claim 12 further including the step of selectively enabling a plurality of transistors such that each phase of the motor has a phase turn on point that occurs before a phase turn off point of a preceding phase, the transistors being coupled to a voltage source and the motor.

14. The method of claim 12 further including the step of pulse width modulating a plurality of transistors such that the DC bus current is regulated at the fixed level.

15. The method of claim 14 further comprising the steps of:
   measuring the DC bus current; and
   comparing the measured DC bus current to the fixed level.

16. The method of claim 15 further including the step of measuring a voltage drop across a resistor in series with a negative rail of the DC bus.

* * * * *

UNITED STATES PATENT AND TRADEMARK OFFICE
CERTIFICATE OF CORRECTION

PATENT NO. : 6,718,125 B2
DATED : April 6, 2004
INVENTOR(S) : Bret S. Clark et al.

It is certified that error appears in the above-identified patent and that said Letters Patent is hereby corrected as shown below:

<u>Title page,</u>
Item [73], Assignee, "Emerson Motor Co." should be -- Emerson Electric Co. --.

Signed and Sealed this

Thirtieth Day of November, 2004

JON W. DUDAS
*Director of the United States Patent and Trademark Office*